Sept. 6, 1955 H. H. SCHULDT 2,716,904
DAMPER ASSEMBLY
Filed April 15, 1953

INVENTOR.
HERBERT H. SCHULDT.
BY
Lockwood, Galt, Woodard & Smith,
ATTORNEYS.

ations and claims:

United States Patent Office 2,716,904
Patented Sept. 6, 1955

2,716,904

DAMPER ASSEMBLY

Herbert H. Schuldt, Indianapolis, Ind., assignor to Schwitzer-Cummins Company, Indianapolis, Ind., a corporation Application April 15, 1953, Serial No. 349,015

5 Claims. (Cl. 74—574)

This invention relates to a damper assembly for internal combustion engines and of the type normally mounted on the end of the engine crankshaft and which may incorporate therein an accessory drive pulley.

In dampers of this character there is interposed between a driving member and a driven inertia member an elastic dampening member generally in the form of a band of rubber. In dampers of this character difficulty is encountered by reason of the heat transfer into the assembly from external sources which has a deleterious effect upon the physical characteristics of the elastic member or band. Thus the damper may be exposed to three sources of heat, namely heat from the hot engine crankshaft upon which it is mounted; heat generated by the accessory driving belt running in the pulley groove due to constant flexing or slippage of the belt therein; and heat conversion from the dampening work of the elastic member. In many instances, the amount of this heat directed to the elastic member or band is so great that it causes changes in operational characteristics thereof leading to eventual failure of the member.

It is, therefore, the object of this invention to provide a damper assembly of a structure whereby the elastic member is isolated from the crankshaft and belt pulley by means of a circumferential slot such as to minimize the heat convection paths. In addition thereto radial vanes are provided as a support for the isolated elastic member including the rim about which it is mounted and the surrounding inertia member, which vanes span the circumwerential slot in such relation thereto as to serve as centrifugal type fan blades for pumping air through the isolating slot, thus offering further insulation and cooling for the elastic member. This arrangement is such that the air currents developed by the radial vanes serve to cool them, and since they are the only connection between the hub and damper the heat convected therethrough is largely dissipated.

The foregoing objects and improvements are accomplished by providing a hub member carrying a peripheral grooved pulley, but with the damper offset from the pulley and the hub member and separated therefrom by a circumferential slot while being rigidly connected transversely of said slot by a series of vanes operating as fan blades.

The full nature of the invention will be understood from the accompanying drawings and the following description and claims:

Figure 1:
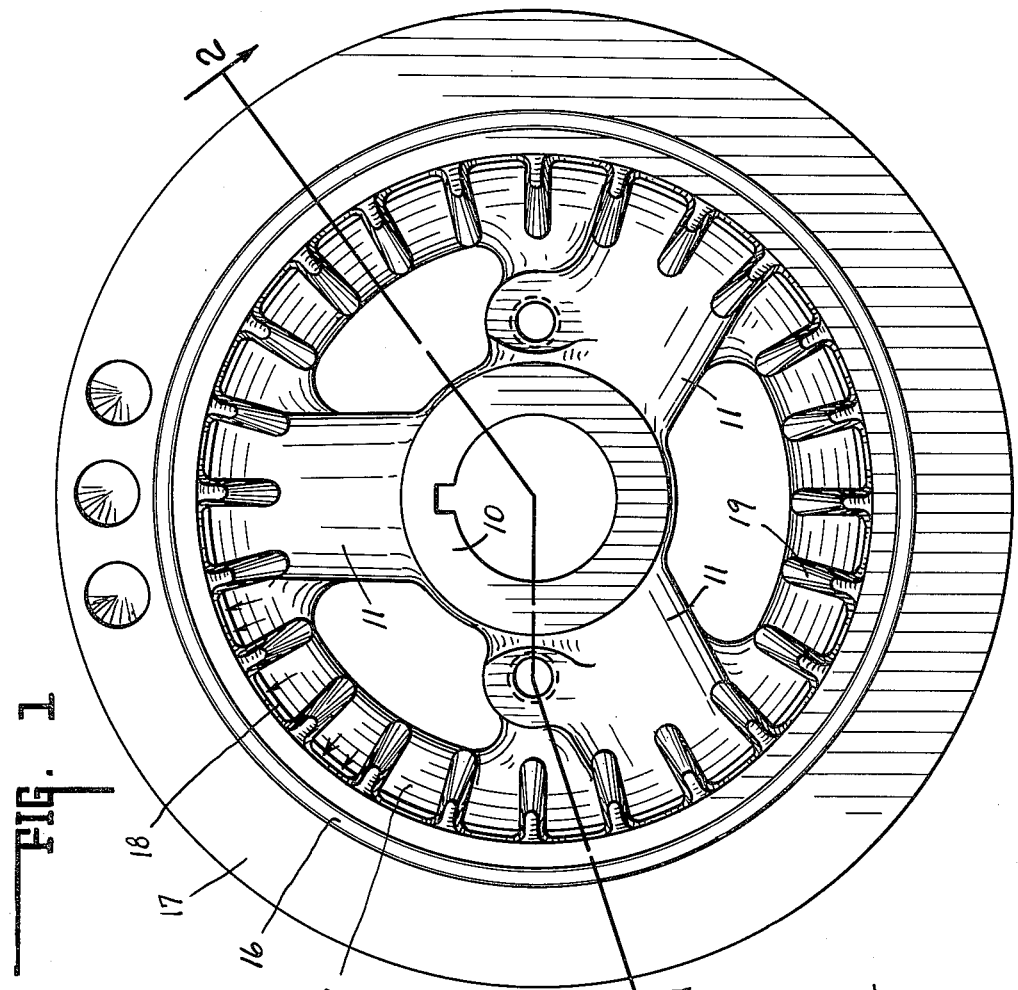
Fig. 1 is a front elevation of the damper assembly.
Figure 2:
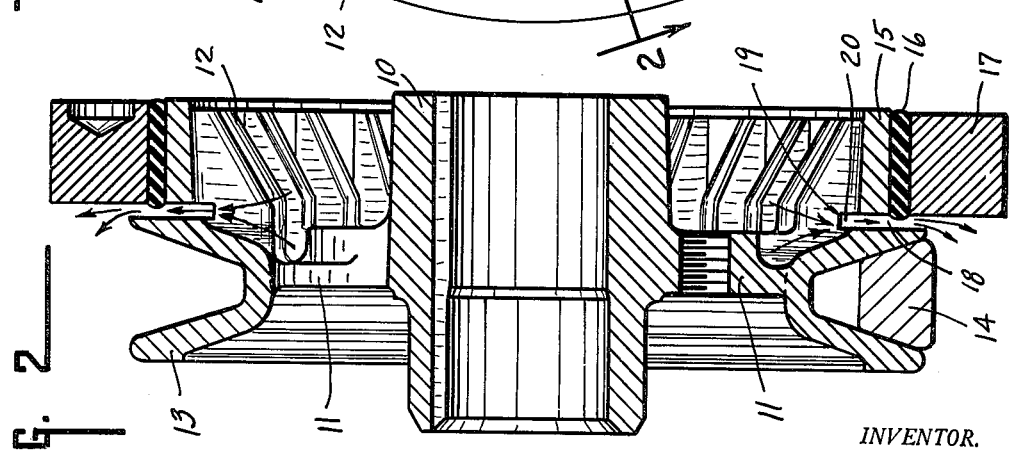
Fig. 2 is a section through the assembly taken on the lines 2—2 of Fig. 1.

In the drawings the damper assembly is shown as comprising a hub 10 adapted to be mounted on the end of the crank shaft of an internal combustion engine in the usual manner. Radiating from the hub there is a series of spokes 11 arranged in spaced relation to provide openings therebetween and terminating at their outer ends in a hub rim 12. Said rim forms a part of a V groove accessory drive pulley 13 for receiving the usual accessory driving belt indicated at 14.

Offset to one side of the pulley, but surrounding the hub 10 in spaced relation thereto there is mounted a damper comprising a mounting rim 15 surrounded by an elastic member or band 16 which may be of rubber or suitable rubber composition. Said band carries and is surrounded by an inertia member or ring 17, all in the well known manner.

The damper including the mounting rim, elastic band and inertia member is spaced and separated from the pulley 13 by a circumferential slot 18 so that there is no path of heat conduction therebetween. However, the said damper is supported on the hub by a series of spaced radially extending vanes 19 integral with rims 12 and 15 and spanning the slot 18. Each of said vanes is slightly cut away in continuation of the slot 18 as indicated at 20.

By reason of the foregoing structure there is no direct communication between the hub and damper structure through which heat may be directly conducted. The only conduction is by way of the relatively thin spaced vanes each having a substantial heat radiating surface from which such heat as may be conducted therethrough is largely dissipated. Additionally, the vanes 19 serve as fan blades which pump a stream of air through the circumferential slot or air passage 18 as indicated by the arrows. The air pumped therethrough not only serves to insulate the damper from the pulley and hub structure but air cools the damper including the elastic member. As a result comparatively little heat imparted to the shaft and pulley from other sources is conducted to the elastic member which is also air cooled through the pump action of the vanes. Consequently there will not be any appreciable amount of heat transferred to affect the rubber or rubber composition of the elastic member as to effect changes in operational characteristics or eventual failure.

The invention claimed is:

1. A damper assembly comprising a hub adapted for mounting on an engine crank shaft, an accessory drive pulley carried by said hub, a spaced series of spokes interconnecting said hub and pulley, an annular damper unit including an elastic member, said unit being offset and spaced from said pulley to provide a circumferential air passage therebetween, and a series of peripherally spaced radiating vanes interconnecting said damper unit and pulley positioned to pump air through said passage.

2. A damper assembly comprising a hub adapted for mounting on an engine crank shaft, a peripheral rim surrounding said hub and secured thereto, an annular damper unit including an elastic member, said damper unit being offset and spaced from said rim to provide a peripheral air passage therebetween, and a series of peripherally spaced radiating vanes interconnecting said damper unit and rim positioned to pump air through said passage.

3. A damper assembly comprising a hub adapted for mounting on an engine crank shaft, a peripheral rim surrounding said hub and secured thereto, an annular damper mounting rim offset to one side of said peripheral rim in spaced relation thereto to provide a circumferential air passage therebetween, an elastic dampening member carried by said damper mounting rim, an inertia member carried by said elastic member, and a series of peripherally spaced radiating vanes interconnecting said rims inwardly of said air passage, said vanes being positioned and arranged to pump air through said passage over said mounting rim and members.

4. A damper assembly comprising a hub adapted for mounting on an engine crank shaft, a series of axially and radially extending vanes carried by said hub, said vanes being peripherally spaced from each other to provide fan blades, a damper mounting rim surrounding and secured about said vanes in spaced relation to said hub to provide an air gap therebetween, an elastic dampening band surrounding and carried by said rim, and an annular inertia member surrounding and carried by said elastic band, said elastic band and inertia member being positioned and arranged adjacent said air gap for air cooling through the action of said fan blades.

5. A damper assembly comprising a hub adapted for mounting on an engine crank shaft, a series of spaced spokes radiating from and secured to said hub, an accessory drive V-pulley integral with the outer ends of said spokes, a series of laterally extending and radially disposed spaced vanes extending from one side of said pulley, a mounting rim surrounding and carried by said vanes, an elastic dampening member surrounding and carried by said rim, and an annular inertia member surrounding and carried by said dampening member, said rim and members being separated from said pulley by a circumferential air passage extending inwardly into said vanes, whereby upon rotation of said hub said vanes will pump air through said passage for air cooling said members.

References Cited in the file of this patent
UNITED STATES PATENTS

| | | |
|---|---|---|
| 1,646,897 | Burns | Oct. 25, 1927 |
| 2,580,839 | Riopelle | Jan. 1, 1952 |
| 2,594,555 | Hardy | Apr. 29, 1952 |